United States Patent
Liu et al.

(10) Patent No.: US 6,950,267 B1
(45) Date of Patent: Sep. 27, 2005

(54) DISK DRIVE MEASURING POLE TIP PROTRUSION BY PERFORMING A WRITE OPERATION TO HEAT THE TRANSDUCER

(75) Inventors: Shih Min Liu, Newport Coast, CA (US); Galvin T. Chia, Rancho Santa Margarita, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 143 days.

(21) Appl. No.: 10/698,786

(22) Filed: Oct. 31, 2003

(51) Int. Cl.[7] ............................................. G11B 21/02
(52) U.S. Cl. ....................................................... 360/75
(58) Field of Search .................................... 360/75, 31

(56) References Cited

U.S. PATENT DOCUMENTS

| | | | |
|---|---|---|---|
| 4,777,544 A | 10/1988 | Brown et al. | |
| 5,121,262 A | 6/1992 | Squires et al. | |
| 5,991,113 A * | 11/1999 | Meyer et al. | 360/75 |
| 6,118,614 A | 9/2000 | Lee | |
| 6,437,930 B1 | 8/2002 | Liu et al. | |
| 6,525,892 B1 | 2/2003 | Dunbar et al. | |
| 6,717,759 B1 * | 4/2004 | Himle et al. | 360/31 |

OTHER PUBLICATIONS

U.S. Appl. No. 10/294,115 filed Nov. 14, 2002, entitled "Methods and Apparatus Determining and/or Using Overshoot Control of Write Current for Optimized Head Write Control in Assembled Disk Drives".

* cited by examiner

Primary Examiner—David Hudspeth
Assistant Examiner—K. Wong
(74) Attorney, Agent, or Firm—Howard H. Sheerin, Esq.

(57) ABSTRACT

A disk drive is disclosed which generates a pole tip protrusion (PTP) measurement by performing a write operation to heat the transducer while measuring a fly height of the transducer. A first data sequence written to the disk is read without heating the transducer to generate a first signal measurement. A second data sequence is then written to the disk in order to heat the transducer, and the first data sequence is again read to generate a second signal measurement. The PTP measurement is then generated in response to the first and second signal measurements.

16 Claims, 5 Drawing Sheets

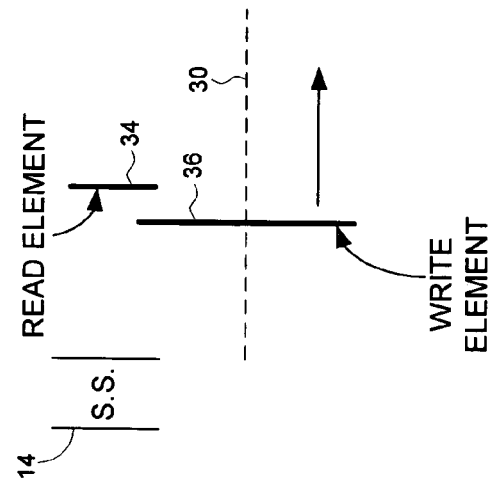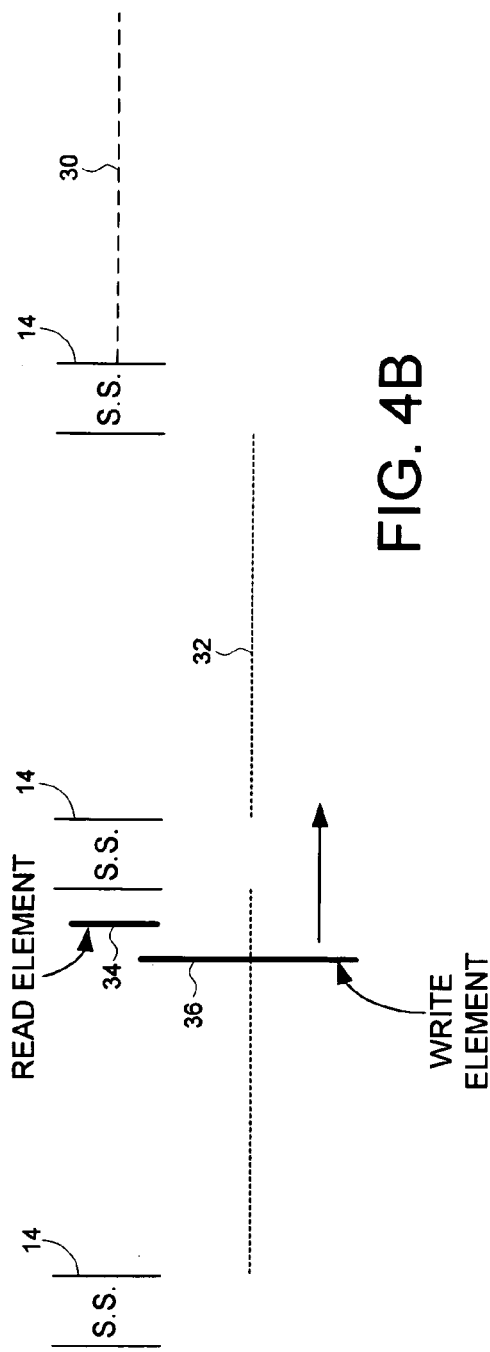

DISK DRIVE MEASURING POLE TIP PROTRUSION BY PERFORMING A WRITE OPERATION TO HEAT THE TRANSDUCER

BACKGROUND OF THE INVENTION

1. Field of the Invention

The present invention relates to disk drives. In particular, the present invention relates to a disk drive measuring pole tip protrusion (PTP) by performing a write operation to heat the transducer.

2. Description of the Prior Art

FIGS. 1A and 1B show a prior art head disk assembly (HDA) comprising a disk 2 having a 11 disk surface 4. The disk 2 is rotated about a center axis while a transducer 6 writes and reads data to/from the disk surface 4. The transducer 6 is mounted in a slider which is attached to the distal end of an actuator arm 8. The actuator arm 8 is rotated about a pivot by a voice coil motor (VCM) 10 in order to actuate the transducer 6 radially over the disk surface 4. The disk surface 4 comprises a number of radially spaced, concentric tracks 12 as defined by a number of embedded servo sectors 14. The embedded servo sectors 14 are read by the transducer 6 and processed by a servo control system in order to maintain the transducer 6 over a center of a target track while writing or reading data. The disk drive may employ top and bottom transducers for reading/writing both the top and bottom surfaces of the disk 2.

As the disk 2 rotates, an air bearing forms between the disk surface 4 and the transducer 6 such that the transducer 6 "flies" just above the disk surface 4. It is desirable to minimize the fly height to achieve high recording densities since the read signal strength increases as the gap between the transducer 6 and disk surface 4 decreases. However, if the transducer 6 actually contacts the disk surface 4 during operation it can result in medium defects as well as undesirable head wear. The physical characteristics of the slider, disk 2, and actuator arm 8, are therefore designed to achieve a desired fly height while minimizing the occurrence of head/disk contact. To facilitate the design process, various in-situ techniques have been employed to measure the fly height of production disk drives. The fly height measurement may also be used to identify and discard or repair marginal disk drives during the manufacturing process as well as to predict drive failure while in the field.

U.S. Pat. No. 4,777,544 discloses a harmonic ratio fly height measurement technique wherein a data sequence is written to the disk which upon readback has a spectrum that is constant along the track and which has non-zero amplitude for at least two different frequencies. For example, a data sequence is written to the disk such that the readback spectrum comprises a fundamental frequency and odd harmonics. The fly height is then measured by computing the natural logarithm of the ratio between the fundamental frequency and the third harmonic frequency at two different fly heights (two different angular velocities). Although this technique provides an adequate fly height measurement of a static head/disk interface, it does not account for changes in fly height due to pole tip protrusion. Pole tip protrusion occurs when the part of the slider expands due to heating during a write operation, wherein the resulting protrusion can cause the slider to contact the disk surface.

There is, therefore, a need to measure pole tip protrusion in a disk drive to facilitate design modifications, manufacture screening, and drive failure prediction.

SUMMARY OF THE INVENTION

The present invention may be regarded as a disk drive comprising a disk and a slider comprising a transducer which is actuated over the disk for generating a write signal when writing data to the disk and for generating a read signal when reading data from the disk. The disk drive further comprises a disk controller for generating a pole tip protrusion (PTP) measurement by writing a first data sequence along a first section of the disk. The first data sequence is read from the first section during a first read operation to generate a first signal measurement. The transducer is heated by writing a second data sequence along a second section of the disk preceding the first section, wherein heating the transducer causes at least part of the slider to protrude toward the disk. While the part of the slider is protruding toward the disk, the first data sequence is again read from the first section during a second read operation to generate a second signal measurement. The PTP measurement is then generated in response to the first and second signal measurements.

In one embodiment, the first data sequence comprises an alternating sequence of high frequency magnetic transitions and low frequency magnetic transitions.

In another embodiment, the first and second sections are aligned along a circumferential path. In an alternative embodiment, the first section is aligned along a first circumferential path, and the second section is aligned along a second circumferential path radially offset from the first circumferential path. In one embodiment, the transducer comprises a read element and a write element, wherein the read element is radially offset from the write element. The disk controller employs a micro-jog value for aligning the read element along the first circumferential path while the write element writes the second data sequence along the second circumferential path.

In still another embodiment, the disk drive comprises a read channel having write gate circuitry for enabling a write gate while writing the second data sequence along the second circumferential path. In one embodiment the read channel comprises read gate circuitry for enabling a read gate during the second read operation after writing the second data sequence along the second circumferential path.

In one embodiment, the read signal is filtered during the first read operation to generate a first harmonic component and a second harmonic component, the read signal is filtered during the second read operation to generate a third harmonic component and a fourth harmonic component, and the PTP measurement is generated in response to the first, second, third and forth harmonic component. In one embodiment, a difference between the first harmonic component and the second harmonic component is computed to generate a first value, and a difference between the third harmonic component and the fourth harmonic component is computed to generate a second value. The PTP measurement is then generated by computing a difference between the first and second values.

The present invention may also be regarded as a method for generating a pole tip protrusion (PTP) measurement for a disk drive. The disk drive comprises a disk and a slider having a transducer actuated over the disk for generating a write signal when writing data to the disk and for generating a read signal when reading data from the disk. A first data sequence is written along a first section of the disk, and then the first data sequence is read from the first section to generate a first signal measurement. The transducer is heated by writing a second data sequence to a second section of the disk preceding the first section, wherein heating the transducer causes at least part of the slider to protrude toward the disk. While the part of the slider is protruding toward the disk, the first data sequence is read again from the first section to generate a second signal measurement. The PTP measurement is then generated in response to the first and second signal measurements.

BRIEF DESCRIPTION OF THE DRAWINGS

FIGS. 4A and 4B shows an embodiment of the present invention wherein the transducer comprises a read element offset from the write element, wherein the second data sequence is written to the disk in order to heat the transducer along a circumferential path that is offset from the path of the first data sequence that is read to generate the PTP measurement.

DESCRIPTION OF THE PREFERRED EMBODIMENTS

Figures 1A, 1B, 2:
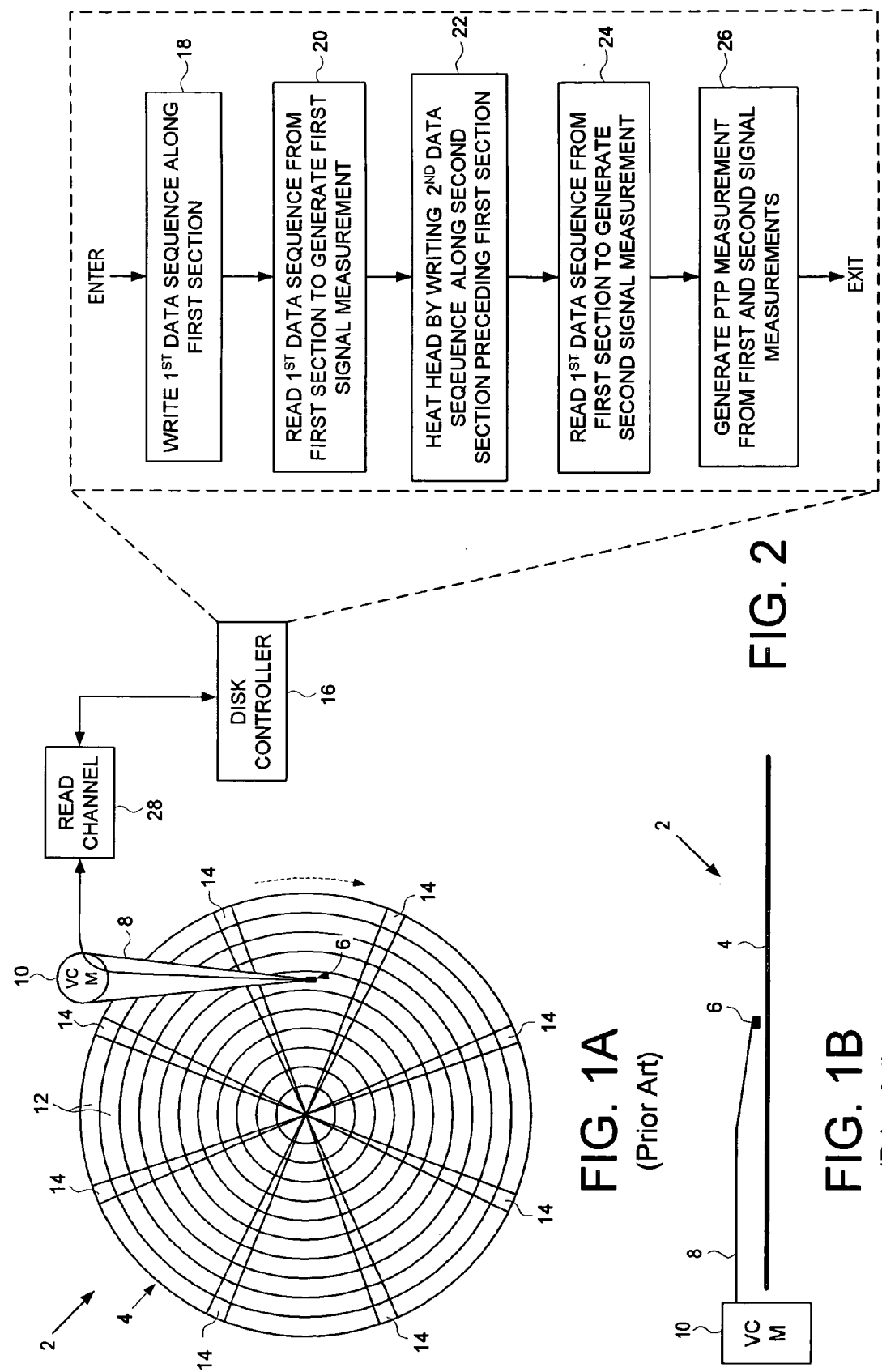
FIGS. 1A and 1B show a prior art disk drive comprising a disk with a slider having a transducer actuated over the disk surfaces by a voice coil motor (VCM), a read channel for demodulating a read signal emanating from the transducer, and a disk controller for controlling operation of the disk drive.
FIG. 2 shows a flow diagram executed by the disk controller according to an embodiment of the present invention for generating a pole tip protrusion (PTP) measurement by writing a first data sequence to the disk, reading the first data sequence to generate a first signal measurement, heating the transducer by writing a second data sequence to the disk, and rereading the first data sequence to generate a second signal measurement.

FIGS. 1A, 1B and 2 show a disk drive according to an embodiment of the present invention comprising a disk 2 and a slider comprising a transducer 6 which is actuated over the disk 2 for generating a write signal when writing data to the disk 2 and for generating a read signal when reading data from the disk 2. The disk drive further comprises a disk controller 16 for generating a pole tip protrusion (PTP) measurement according to the flow diagram of FIG. 2. At step 18 a first data sequence is written along a first section of the disk 2. At step 20 the first data sequence is read from the first section during a first read operation to generate a first signal measurement. At step 22 the transducer 6 is heated by writing a second data sequence along a second section of the disk 2 preceding the first section, wherein heating the transducer 6 causes at least part of the slider to protrude toward the disk 2. While the part of the slider is protruding toward the disk 2, at step 24 the first data sequence is again read from the first section during a second read operation to generate a second signal measurement. At step 26 the PTP measurement is then generated in response to the first and second signal measurements.

The disk drive in FIG. 1A comprises a read channel 28 for demodulating the read signal emanating from the transducer 6 into an estimated data sequence provided to the disk controller 16. The read channel 28 may also comprise suitable servo demodulation circuitry for demodulating the embedded servo sectors 14 into servo signals provided to the disk controller 16 for position the transducer 6 over the target track. In one embodiment, the read channel 28 further comprises suitable circuitry for generating the first and second signal measurements, such as filters for extracting a first and third harmonic as described in more detail below with reference to FIG. 5. The read channel 28 may be implemented as a separate integrated circuit, or it may be combined with the disk controller 16 into a "system on a chip".

Any suitable data sequences may be employed to perform the PTP measurement. In one embodiment, the first data sequence is written to the disk 2 by writing a first sequence of magnetic transitions to the first section, and then writing a second sequence of magnetic transitions to the first section. In another embodiment, the first data sequence may be written to the disk 2 by writing a single sequence of magnetic transitions, such as a triple harmonic pattern comprising an alternating sequence of high frequency magnetic transitions and low frequency magnetic transitions as described in more detail with reference to FIG. 6.

Figure 3A:
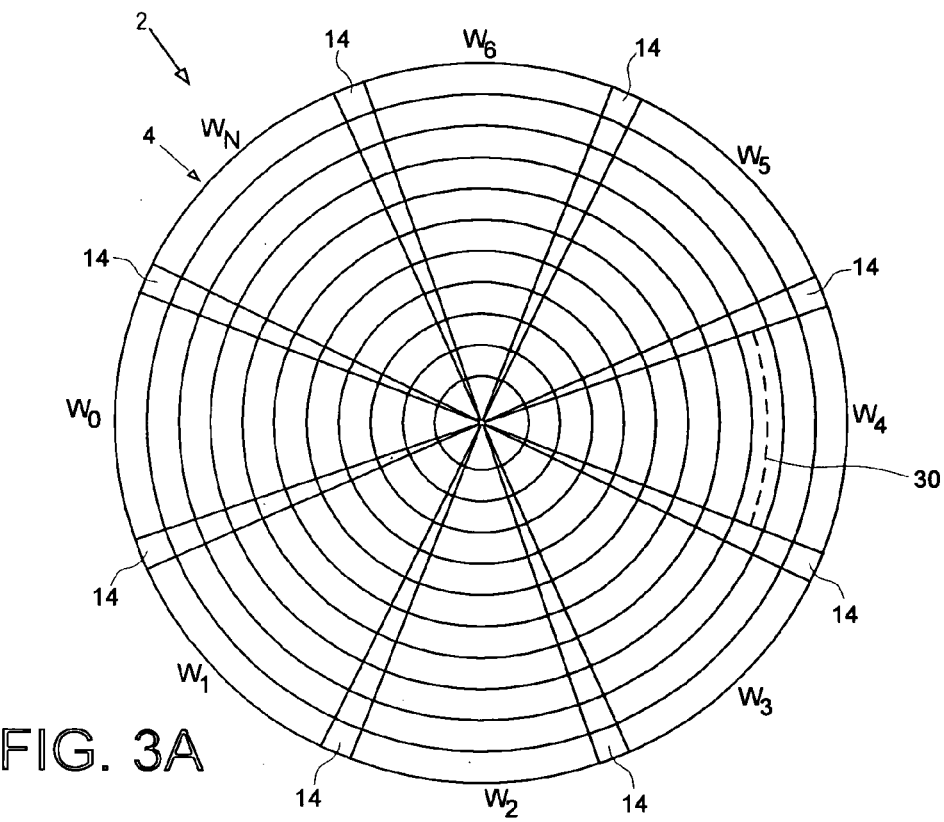
FIG. 3A illustrates an embodiment wherein the first data sequence is written in a selected wedge.
Figure 3B:
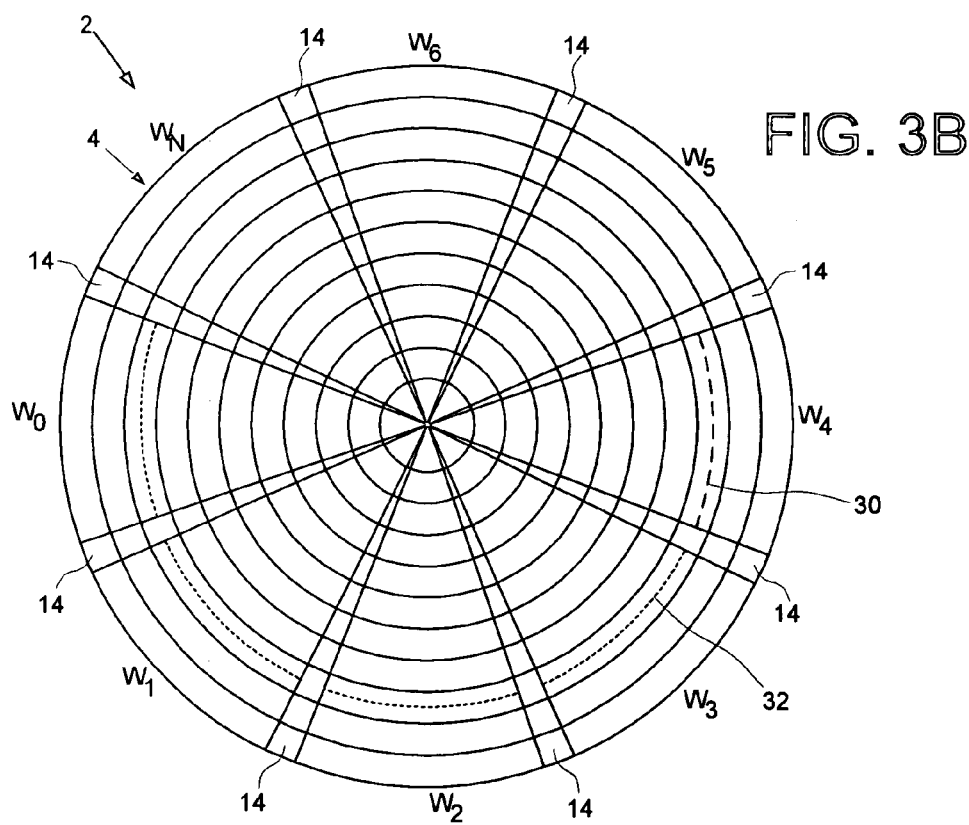
FIG. 3B illustrates an embodiment wherein the second data sequence is written to the disk in a number of wedges preceding the first data sequence in order to heat the transducer.

FIGS. 3A and 3B illustrate an embodiment of the present invention wherein the embedded servo sectors 14 define a number of wedges $W_0-W_N$. The first data sequence 30 is written in a selected wedge $W_4$ and read during the first read operation to generate the first signal measurement. In FIG. 3B, the transducer 6 is heated by writing a second data sequence 32 in wedges $W_0-W_3$ preceding wedge $W_4$, and then the first data sequence 30 is read immediately thereafter during the same revolution of the disk 2 to generate the second signal measurement. In an alternative embodiment, the first data sequence 30 and/or the second data sequence 32 are written to data sectors within a wedge rather than writing an entire wedge. Any suitable data sequence 32 may be written to the disk 2 in order to heat the transducer 6, such as a data sequence that writes a high frequency sequence of magnetic transitions. The second data sequence 32 may also be the same as the first data sequence 30.

In the embodiment of FIGS. 3A and 3B, the second data sequence 32 is aligned with the first data sequence 30 along the same circumferential path. However in an alternative embodiment, the second data sequence 32 may be written along a circumferential path which is radially offset from the circumferential path of the first data sequence 30. This embodiment is illustrated in FIGS. 4A and 4B wherein the transducer 6 comprises a magnetoresistive transducer having a read element 34 which is radially offset from a write element 36. As shown in FIG. 4A, when writing the first data sequence 30 to the disk 2 the read element 34 reads the embedded servo sectors 14 and provides position information to the disk controller 16. The disk controller 16 generates appropriate servo control signals to the VCM 10 in order to maintain the read element 34 over the center of a target track while the write element 36 writes the first data sequence 30 to the disk 2. When reading the first data sequence 30, the disk controller 16 introduces a "micro-jog" value into the servo control signals to account for the offset between the read/write elements to thereby align the read element 34 along the circumferential path of the first data sequence 30. As shown in FIG. 4B, when the second data sequence 32 is written to the disk 2 the disk controller 16 servos on the embedded servo sectors 14 using the same micro-jog value as that used to read the first data sequence 30. In this manner the first data sequence 30 can be read immediately after writing the second data sequence 32 without having to compensate for the offset between read/write elements as would typically be the case when switching from a normal write operation to a read operation. The second data sequence 32 can be written in this manner since it is never actually read; it is only written to heat the transducer 6. In one embodiment, a particular region of the disk 2 is reserved to perform the PTP measurement so that other user data recorded on the disk 2 is not corrupted when the second data sequence 32 is written to the disk 2.

Figure 5:
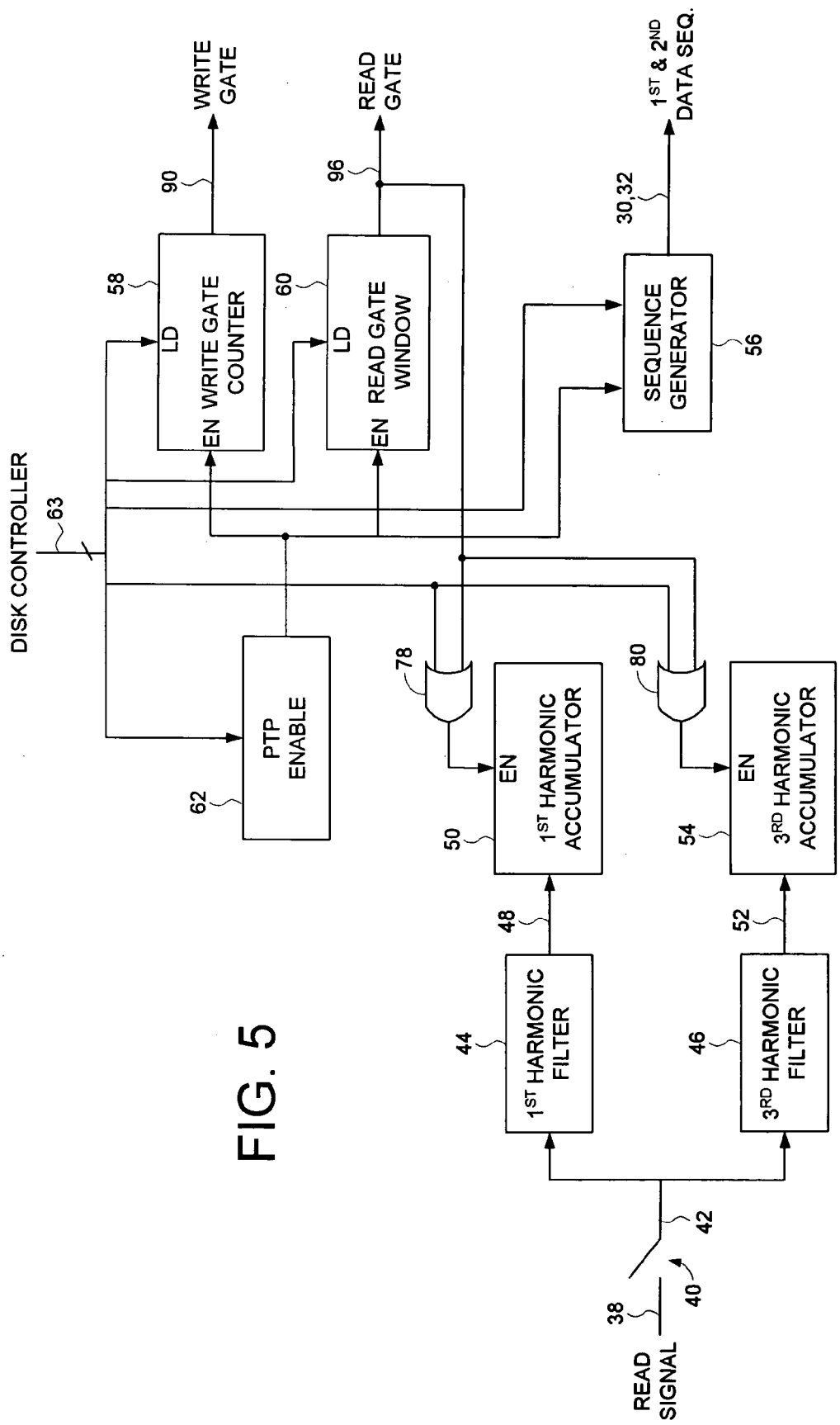
FIG. 5 shows components of a read channel according to an embodiment of the present invention which facilitiate the PTP measurement.

FIG. 5 shows components of a read channel 28 according to an embodiment of the present invention which facilitate the PTP measurement. The read signal 38 emanating from the transducer 6 is sampled by sampling device 40, and the read signal sample values 42 filtered by a first filter 44 for extracting the first harmonic component and by a second filter 46 for extracting the third harmonic component. The samples 48 of the first harmonic component are accumulated by a first harmonic accumulator 50, and the samples 52 of the third harmonic component are accumulated by a third harmonic accumulator 54. A sequence generator 56 generates the first data sequence 30 and the second data sequence 32. A write gate counter circuit 58 is loaded with a number of wedges for writing the second data sequence 32. A read gate window circuit 60 is programmed with a delay equal to the interval for writing the second data sequence 32, together with a window length for reading the first data sequence 30. A bit in a register 62 is programmed in order to enable the PTP mode, and the disk controller 16 generates various control signals 63 for controlling the read channel 28 components to generate the PTP measurement.

Figure 6:
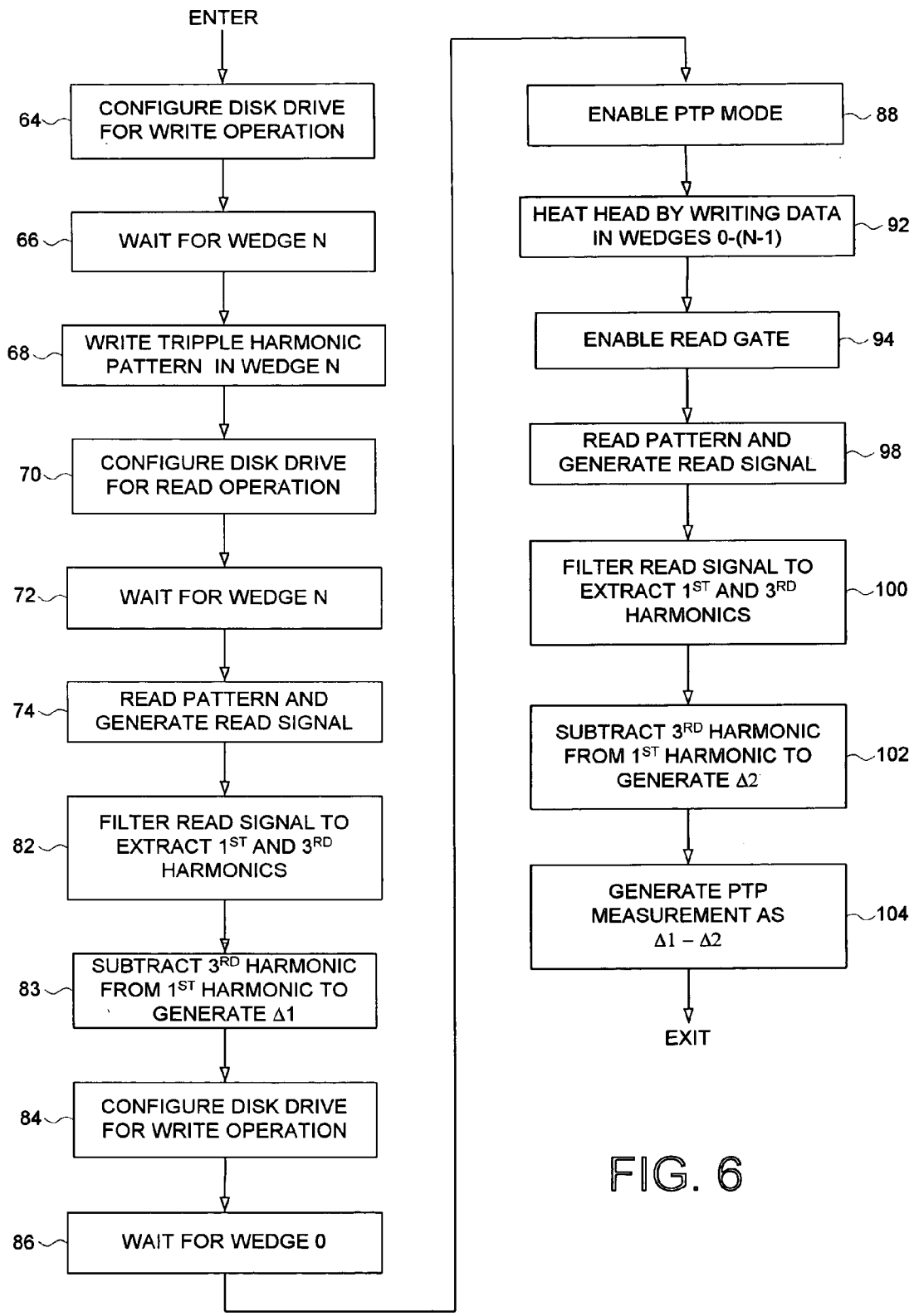
FIG. 6 is a more detailed flow diagram according to an embodiment of the present invention wherein the PTP measurement is generated as the difference between harmonics in the read signal when reading the first data sequence.

FIG. 6 is a flow diagram according to a more detailed embodiment of the present invention for generating the PTP measurement using the read channel circuitry of FIG. 5. At step 64, the disk drive is configured for a write operation, which includes activating the appropriate transducer (in a multiple transducer disk drive) and configuring the disk controller 16 to servo the transducer 6 over the target track for writing the first data sequence 30. Once the transducer 6 is servoing over the target track, at step 66 the disk controller 16 waits until the transducer 6 reaches wedge N which in one embodiment is identified relative to an index mark recorded in one of the servo sectors 14. When the transducer 6 reaches the servo sector 14 identifying wedge N, at step 68 the disk controller 16 writes the first data sequence 30 comprising a triple harmonic pattern to wedge N via the read channel 28. The triple harmonic pattern comprises a sequence 11111000001111100000 . . . which writes a an alternating sequence of high frequency magnetic transitions and low frequency magnetic transitions.

At step 70 the disk drive is configured for a read operation, which includes activating the appropriate transducer and configuring the disk controller 16 to servo the transducer 6 over the target track for reading the first data sequence 30 including the use of an appropriate micro-jog value if the transducer 6 is a magnetoresistive transducer. Once the transducer 6 is servoing over the target track, at step 72 the disk controller 16 waits until the transducer 6 reaches wedge N. When the transducer 6 reaches wedge N, at step 74 the disk controller 16 enables the harmonic accumulators 50 and 54 (FIG. 5) via OR gates 78 and 80 and reads the first data sequence 30 from wedge N to generate the read signal 38. At step 82 the read signal 38 is filtered by filters 44 and 46 to extract the first harmonic component and the third harmonic component, and the samples of the harmonic components are accumulated by the harmonic accumulators 50 and 54. The disk controller 16 then computes an initial fly height measurement Δ1 at step 83 prior to heating the transducer 6 in response to the values stored in the harmonic accumulators 50 and 54. The fly height of the transducer 6 can be estimated by computing the natural log of the ratio f1/f3, where f1 is the amplitude of the first harmonic component and f3 is the amplitude of the third harmonic component. The natural log of the ratio f1/f3 can be estimated by computing the difference between the amplitude of the first and third harmonic components. Therefore at step 83, the disk controller 16 generates an initial fly height measurement Δ1 as the difference between the amplitudes of the first and third harmonic components stored in the harmonic accumulators 50 and 54.

At step 84 the disk drive is again configured for a write operation, which may include activating the appropriate transducer and configuring the disk controller 16 to servo the transducer 6 over the target track for reading the first data sequence 30 including the use of an appropriate micro-jog value if the transducer 6 is a magnetoresistive transducer (see the above description with reference to FIG. 4B as to why the disk controller 16 is configured to servo over the target track for reading the first data sequence 30 while writing the second data sequence 32). Once the transducer 6 is servoing over the target track, at step 86 the disk controller 16 waits until the transducer 6 reaches wedge 0 (or any other suitable wedge preceding wedge N).

At step 88, the disk controller 16 configures the read channel 28 for the PTP measurement by programming the write gate counter circuit 58 (FIG. 5) with a value corresponding to the number wedges for writing the second data sequence 32, and programming the read gate window circuit 60 with a delay value corresponding to the write interval together with a read window for reading the first data sequence 30. The disk controller 16 then enables the PTP mode at step 88 by programming register 62 which enables the sequence generator 56 and the write gate 90 via the write gate counter 58 so that at step 92 the second data sequence 32 is written to wedges $W_0$–$W_{N-1}$ to thereby heat the transducer 6.

After writing the second data sequence 32 to wedges $W_0$–$W_{N-1}$ the transducer 6 is already servoing over the target track and the read element 34 (FIG. 4B) is aligned with the first data sequence 30. Therefore at step 94 the read gate signal 96 is enabled by the read gate window circuit 60, and at step 98 the first data sequence 30 is read immediately from wedge N to generate the read signal 38. At step 100 the read signal 38 is again filtered by filters 44 and 46 to extract the first and third harmonic components, the samples of which are accumulated by the harmonic accumulators 50 and 54. At the end of wedge N, the read gate window circuit 60 disables the read gate 96 and the harmonic accumulators 50 and 54 via OR gates 78 and 80. At step 102 the disk controller 16 subtracts the values stored in the harmonic accumulators 50 and 54 to generate a second fly height measurement Δ2. At step 104 the disk controller 16 computes a difference between the initial fly height measurement Δ1 and the second fly height measurement Δ2 to generate the PTP measurement.

We claim:

1. A disk drive comprising:
 (a) a disk;
 (b) a slider comprising a transducer actuated over the disk for generating a write signal when writing data to the disk and for generating a read signal when reading data from the disk; and
 (c) a disk controller for generating a pole tip protrusion (PTP) measurement by:

writing a first data sequence along a first section of the disk;

reading the first data sequence from the first section during a first read operation and generating a first signal measurement;

heating the transducer by writing a second data sequence along a second section of the disk preceding the first section, wherein heating the transducer causes at least part of the slider to protrude toward the disk;

while the part of the slider is protruding toward the disk, reading the first data sequence from the first section during a second read operation and generating a second signal measurement; and generating the PTP measurement in response to the first and second signal measurements.

2. The disk drive as recited in claim 1, wherein the first data sequence comprises an alternating sequence of high frequency magnetic transitions and low frequency magnetic transitions.

3. The disk drive as recited in claim 1, wherein the first and second sections are aligned along a circumferential path.

4. The disk drive as recited in claim 1, wherein:
(a) the first section is aligned along a first circumferential path; and
(b) the second section is aligned along a second circumferential path radially offset from the first circumferential path.

5. The disk drive as recited in claim 4, wherein:
(a) the transducer comprises a read element and a write element, wherein the read element is radially offset from the write element; and
(b) the disk controller employs a micro-jog value for aligning the read element along the first circumferential path while the write element writes the second data sequence along the second circumferential path.

6. The disk drive as recited in claim 1, further comprising a read channel comprising write gate circuitry for enabling a write gate while writing the second data sequence along the second circumferential path.

7. The disk drive as recited in claim 1, further comprising a read channel comprising read gate circuitry for enabling a read gate during the second read operation after writing the second data sequence along the second circumferential path.

8. The disk drive as recited in claim 1, wherein the disk controller:
(a) filters the read signal during the first read operation to generate a first harmonic component and a second harmonic component;
(b) filters the read signal during the second read operation to generate a third harmonic component and a fourth harmonic component; and
(c) generates the PTP measurement in response to the first, second, third and forth harmonic components.

9. The disk drive as recited in claim 8, wherein the disk controller:
(a) computes a difference between the first harmonic component and the second harmonic component to generate a first value;
(b) computes a difference between the third harmonic component and the fourth harmonic component to generate a second value; and
(c) generates the PTP measurement by computing a difference between the first and second values.

10. A method of generating a pole tip protrusion (PTP) measurement for a disk drive, the disk drive comprising a disk and a slider having a transducer actuated over the disk for generating a write signal when writing data to the disk and for generating a read signal when reading data from the disk, the method comprising the steps of:

(a) writing a first data sequence along a first section of the disk;

(b) reading the first data sequence from the first section during a first read operation and generating a first signal measurement;

(c) heating the transducer by writing a second data sequence along a second section of the disk preceding the first section, wherein heating the transducer causes at least part of the slider to protrude toward the disk;

(d) while the part of the slider is protruding toward the disk, reading the first data sequence from the first section during a second read operation and generating a second signal measurement; and (e) generating the PTP measurement in response to the first and second signal measurements.

11. The method as recited in claim 10, wherein the first data sequence comprises an alternating sequence of high frequency magnetic transitions and low frequency magnetic transitions.

12. The method as recited in claim 10, wherein the first and second sections are aligned along a circumferential path.

13. The method as recited in claim 10, wherein:
(a) the first section is aligned along a first circumferential path; and
(b) the second section is aligned along a second circumferential path radially offset from the first circumferential path.

14. The method as recited in claim 13, wherein:
(a) the transducer comprises a read element and a write element, wherein the read element is radially offset from the write element; and
(b) further comprising the step of aligning the read element along the first circumferential path using a micro-jog value while the write element writes the second data sequence along the second circumferential path.

15. The method as recited in claim 10, further comprising the steps of:
(a) filtering the read signal during the first read operation to generate a first harmonic component and a second harmonic component;
(b) filtering the read signal during the second read operation to generate a third harmonic component and a fourth harmonic component; and
(c) generating the PTP measurement in response to the first, second, third and forth harmonic components.

16. The method as recited in claim 15, further comprising the steps of:
(a) computing a difference between the first harmonic component and the second harmonic component to generate a first value;
(b) computing a difference between the third harmonic component and the fourth harmonic component to generate a second value; and
(c) computing a difference between the first and second values.

* * * * *